United States Patent
Jayasimha et al.

(10) Patent No.: US 6,564,377 B1
(45) Date of Patent: May 13, 2003

(54) SELF-DESCRIBING COMPONENTS WITHIN A SOFTWARE CATALOG

(75) Inventors: Varsha Jayasimha, Redmond, WA (US); Markus Horstmann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/361,497

(22) Filed: Jul. 26, 1999

(51) Int. Cl.[7] .............................................. G06F 9/445
(52) U.S. Cl. ...................................................... 717/174
(58) Field of Search ........................... 717/11, 174–178; 707/100–103 R, 203

(56) References Cited

U.S. PATENT DOCUMENTS

| | | | |
|---|---|---|---|
| 5,485,617 A | | 1/1996 | Stutz et al. |
| 5,517,645 A | | 5/1996 | Stutz et al. |
| 5,602,993 A | * | 2/1997 | Stormberg .................... 717/11 |
| 5,706,505 A | | 1/1998 | Fraley et al. |
| 5,794,038 A | | 8/1998 | Stutz et al. |
| 5,890,161 A | * | 3/1999 | Helland et al. ............. 707/103 |
| 5,911,068 A | | 6/1999 | Zimmerman et al. |
| 5,933,646 A | * | 8/1999 | Hendrickson et al. ........ 717/11 |
| 5,970,490 A | * | 10/1999 | Morgenstern ................ 707/10 |
| 6,018,725 A | * | 1/2000 | Boucher et al. .............. 717/11 |
| 6,144,960 A | * | 11/2000 | Okada et al. ................. 707/10 |
| 6,151,707 A | * | 11/2000 | Hecksel et al. ................ 717/11 |
| 6,167,567 A | * | 12/2000 | Chiles et al. .................. 717/11 |

OTHER PUBLICATIONS

Simon. Building Component Software with COM and Eiffel. Microsoft Corp. 1992–1995. pp. 364–374.*
Nicoloudis e al. Implementing Trading Object Services in COM. IEEE. 2000. pp. 230–239.*
Wang et al. Customization of Distributed Systems Using COM. IEEE. 1998. pp. 8–12.*
Chappell, D., "COM+ The Future of Microsoft's Component Object Model", *Distributed Computing Monitor*, vol. 13, No. x, pp. 3–17(1998).
"Components", *Inside Com*, Chapter 1, pp. 1–13 (Date and Author Unknown).
"HRESULTs, GUIDs, the Registry, and Other Details", *Inside Com*, Chapter 6, pp. 116–126 (Date and Author Unknown).

* cited by examiner

*Primary Examiner*—Gregory Morse
*Assistant Examiner*—Wei Zhen
(74) *Attorney, Agent, or Firm*—Merchant & Gould P.C.

(57) ABSTRACT

A method for installing and registering a COM component objects within a registration datastore of a computing system. The method comprising checking the COM component object to determine whether it contains a set of self-describing data, and if the COM component contains the set of self-describing data, perform a sequence of operations. These operations begin by extracting the self-describing data from the COM component. Next the operations register the COM component using the extracted self-describing data by storing registration data within the registration datastore. Finally the operations end after deriving additional registration data using the extracted self-describing data and storing the additional registration data within the registration datastore. The self-describing COM component comprises a first data field containing data representing a dynamic link library. A second data field derived from the first data field comprising a reserve word module. A third data field derived from the second data field comprising one or more self-describing component data elements. A fourth data field functioning to indicate the end of the self-describing COM component object, wherein the one or more self-describing component data elements are extracted by the system registrar module to generate data stored within the registration datastore.

19 Claims, 6 Drawing Sheets

SELF-DESCRIBING COMPONENTS WITHIN A SOFTWARE CATALOG

TECHNICAL FIELD

This invention relates in general to a method and apparatus for providing system registration information installed within a software catalog of a computing system, and more particularly to a method and apparatus for providing system registration information directly from the component object that is installed within the software catalog of a computing system.

BACKGROUND OF THE INVENTION

Prior to this invention, COM objects were installed into a system by requiring the object developer to modify the system registry to place the registration information within it. By placing the registration information in the registry, the COM objects informed the system of their existence, location, and properties. This software architecture required all developers to both understand and utilize the organization and structure of the system registry in order to install their objects. This requirement was significant in that the actions of one developer could adversely affect the operation of other objects once the common registration information in the registry was altered. Additionally, the previously implemented organization and structure of the registry needed to be maintained to ensure the operation of legacy components within a system.

Currently, COM objects, or DLLs, are installed into a system registry by invoking a well defined entry point called DllRegisterServer. They are uninstalled from the system registry by calling another well defined entry point called DllUnregisterserver. This process adds a layer of complexity to the task of the developer in that he or she must understand the organization and structure of the system registry in order to be able to correctly modify it without affecting the operation of other objects already installed within the system registry. This process also adds a system legacy requirement to the registry in that its organization and structure must be maintained to continue to operate with existing DLLs. Finally, the system registry is a general purpose storage area shared by the entire system and used for many purposes. Also, access to the registry has not been particularly optimized for use at runtime The present invention addresses each of these deficiencies.

SUMMARY

To overcome the limitations in the prior art described above, and to overcome other limitations in the prior art that will become apparent upon reading and understanding the present specification, the present invention discloses a method and apparatus—for providing system registration information directly from the component object that is installed within the software catalog of a computing system.

Because of a desire to eliminate problems associated with developers having to modify the system registry as part of an object installation process as well as a desire to make the registry storage, location and format independent, an improved registration process utilizes self-describing objects to obtain the registration data. In this registration process, data to describe the components are stored within the component in an easily recognizable form. The registration process extracts the data from the self describing component and installs the data within the registration database. The database is presented to the installing process in the form of a data table to remove the developer from individually modifying the database directly.

The present invention solves the above-described problems by providing a method for installing and registering configuration data of COM component objects within a registration database of a computing system, the method comprising checking the COM component object to determine whether it contains a set of self-describing data. The registration process performs the following: extracts the self-describing data from the COM component, registers the COM component using the extracted self-describing data by storing registration data within the registration database and deriving additional registration data from the extracted self-describing data and storing the additional registration data within the registration database.

Another aspect of the present invention is a computer-readable medium having stored thereon a data structure defining a self-describing COM component object to be read by a system registrar module to install and register the self-describing COM component within a registration datastore. A first data field contains data representing a dynamic link library. A second data field derived from the first data field has a reserve word module. A third data field derived from the second data field has one or more self-describing component data elements. A fourth data field functions to indicate the end of the self-describing COM component object, wherein the one or more self-describing component data elements are extracted by the system registrar module to generate data stored within the registration datastore.

These and various other advantages and features of the invention are pointed out with particularity in the claims annexed hereto and form a part hereof. However, for a better understanding of the invention and its advantages, reference should be made to the drawings which form a further part hereof, and to accompanying descriptive matter, in which there are illustrated and described specific examples of embodiments in accordance with the invention.

BRIEF DESCRIPTION OF THE DRAWINGS

Referring now to the drawings in which like reference numbers represent corresponding parts throughout.

DETAILED DESCRIPTION

An embodiment of the present invention defines a new software object registration system in which registration data stored within a registration datastore is obtained directly from the object being installed. The new registration system extracts the registration data from the software object, stores it within the registration datastore, and implements service specific options which are not part of the software object being installed. In one embodiment, the new registration system replaces the current system in which COM components in DLLs are installed and uninstalled with a system registry utilizing two well defined entry points, DllRegisterServer and DllUnregisterServer. The developer is no longer responsible for providing executable code within the DLL to modify the system registry to perform the installation.

Figure 1:
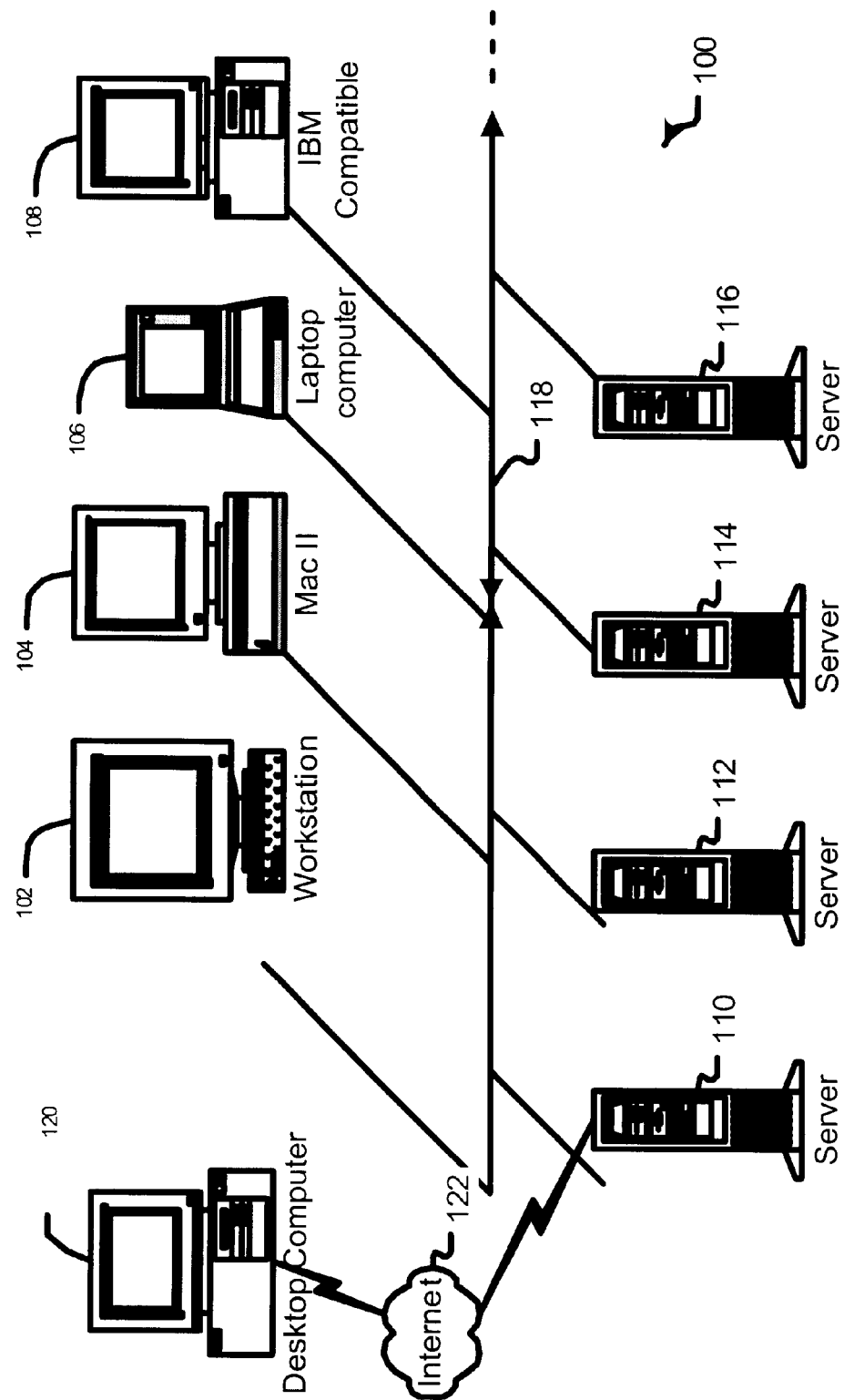
FIG. 1 illustrates a client server system used in conjunction with an example embodiment of the present invention.

FIG. 1 is a pictorial representation of a suitable client-server computing environment in which an embodiment of the present invention may be implemented in both clients and servers. In a computing network 100, client computer systems 102, 104, 106 and 108 are connected to server computer systems 110, 112, 114 and 116 by a network connection 118. Additionally, client computer 120 is connected to server computer 110 via a communication link, such as the Internet 122 or a local area network. Since the server 110 is connected via the network connection 118 to the other servers 112, 114 and 116, the client computer 120 is also connected and may access information on the other servers 112, 114 and 116, and clients 102, 104, 106, and 108, as well as other computer systems coupled to the network 100.

The client computer systems 102, 104, 106, 108 and 120 operate using at least some of the information and processes available on at least one of the servers 110, 112, 114 and 116 as well as other computer systems coupled to the network 100. Each client is preferably a complete, stand-alone computer and offers the user a full range of power and features for running applications. The clients 102, 104, 106 and 108, however, may be quite different from the other clients as long as they can communicate via the common interface 118.

The servers 110, 112, 114 and 116 are preferably computers, minicomputers, or mainframes that provide traditional strengths offered by minicomputers and mainframes in a time-sharing environment (e.g., data management, information sharing between clients, and sophisticated network administration and security features). The client and server machines work together to accomplish the processing of the executed application. Working together in this manner increases the processing power and efficiency relating to each independent computer system shown in FIG. 1.

Typically, a client portion or process of an application executed in the distributed network 100 is optimized for user interaction whereas a server portion or process provides the centralized, multi-user functionality. However, each client computer 102, 104, 106, 108 and 120 can perform functions for other computers, including the clients and servers, thus acting as a "server" for those other computer systems. Similarly, each of the servers 110, 112, 114 and 116 can perform functions and relay information to the other servers, such that each server may act as a "client" requesting information or services from another computer in particular circumstances. Therefore, the term "client," as used hereinafter refers to any computer system making a call or request of another computer system and the term "server" is the computer system servicing the request.

As part of the sophisticated network administration, each computer is able to access configuration information related to applications and resources available on the other computers in the network 100. The configuration information is located within memory or persistent storage on each computer system, i.e., in a datastore. Additionally, each computer system may have more than one datastore of configuration information that must be accessed by the other computer systems. Moreover, the different datastores may each have different data types or formats. In order to access configuration information from these many and various computer datastores, a client, i.e., the system or process making the request for information, communicates with a "catalog" interface on the computer system.

Figure 2:
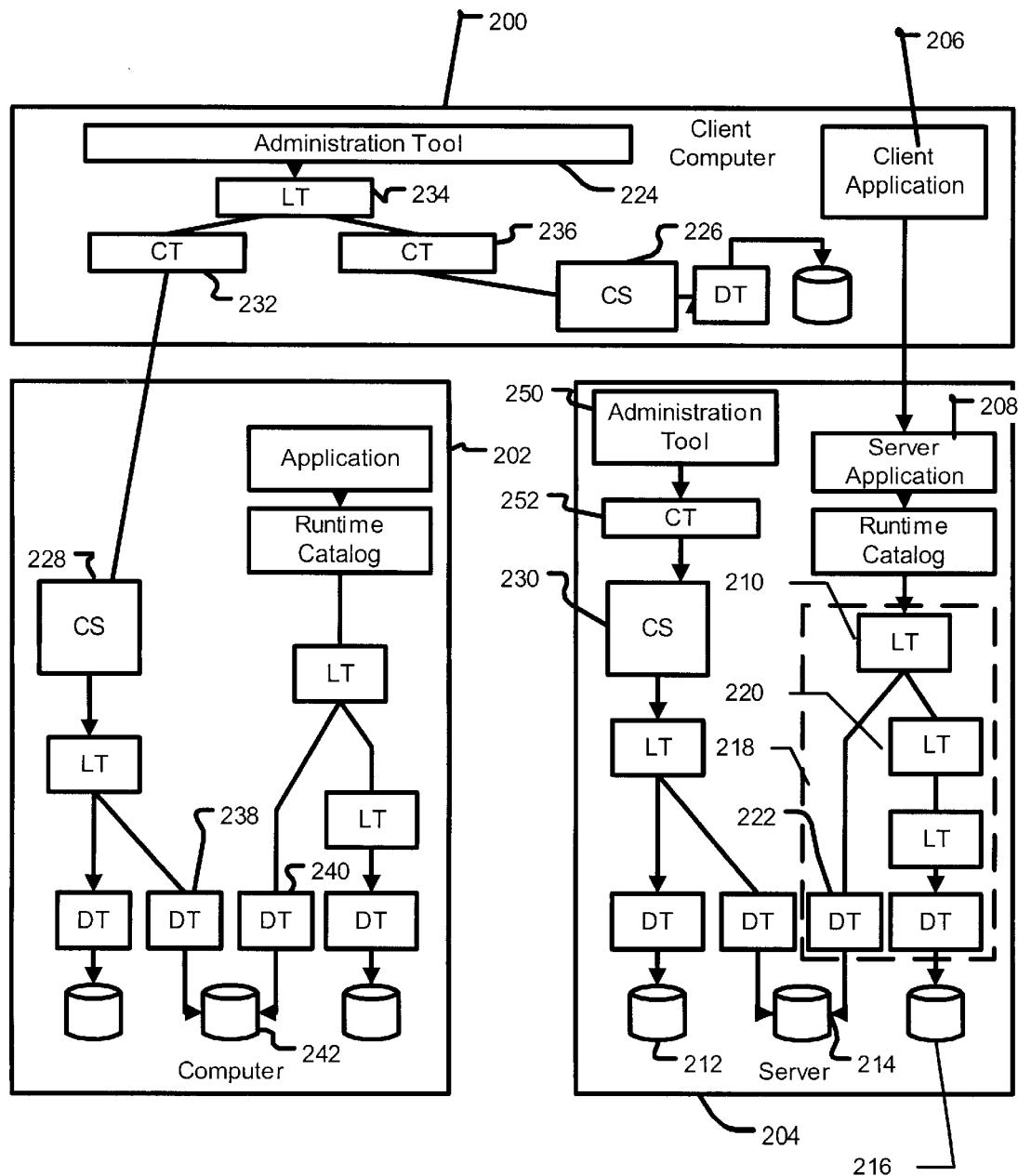
FIG. 2 illustrates an exemplary client server architecture employing a COM+catalog in accordance with the present invention.

FIG. 2 depicts an exemplary client/server architecture employing COM+ catalogs in accordance with the present invention (COM is an acronym for Component Object Model). A COM+ Catalog is a virtualized database of COM+ applications and their services, with runtime and configuration-time abstraction layers for using and manipulating configuration information. An embodiment of the present invention, for example, may be employed in a component-based programming model of a transaction processing runtime environment for developing, deploying, and managing high-performance, scaleable, and robust enterprise Internet and intranet server applications.

A "component" is software containing classes that may be created and exposed as "objects" (i.e., self-contained programmed entities that consist of both data and functions to manipulate the data) for use by another application. A component can also use objects exposed by another application. For example, a developer can create an application using ActiveX components that can be updated and managed easily as in-process DLLs (Dynamic Link Libraries). The DLLs are then installed into the COM environment for execution within the application. Components can be developed specifically for a developer's single application, developed for use with multiple applications, or purchased from a third party.

COM technology allows a piece of software to offer services to another piece of software by making those services available as "COM objects". COM is a foundation for an object-based system that focuses on reuse of interfaces. It is also an interface specification from which any number of interfaces can be built. Each COM object is an instance of a particular class and supports a number of interfaces, generally two or more. Each interface includes one or more methods, which are functions that can be called by the objects' clients.

COM+ technology is an extension of COM technology that includes a new runtime library that provides a wide range of new services, such as dynamic load balancing, queued components, an in-memory database, and events. COM+ technology maintains the basics of COM technology, and existing COM-based applications can continue to work unchanged in a COM+ environment.

An object implemented to comply with COM+ is referred to as a "COM+ object". A component that includes one or more classes that may be instantiated as a COM+ object is referred to as a "COM+ component". Each COM+ component has attributes, which can be set in a component (or type) library. Attributes are a form of configuration data required by many software components to execute correctly and completely. An application that includes COM+ components is referred to as a "COM+ application". When a component is made part of a COM+ application, its component (or type) library is written into a COM+ catalog. When an object is instantiated from that component, the attributes in the COM+ catalog are examined to determine the object context that contains properties for the object. Based on the object context, other services required by the object are provided. In this manner, a developer can merely identify in the attributes the additional functionality required by the object, and based on the object's attributes, the appropriate other services that are available within the system, or the accessible network, are executed to provide that functionality.

In FIG. 2, a client computer 200 is coupled via a network to one or more remote computers (e.g., a computer 202 and a server 204). Although the embodiments of the present invention are illustrated and described herein relative to multiple computer systems coupled by a computer network or other communications connection, it is to be understood that an embodiment of the present invention may be employed in a stand-alone computer system to provide access to configuration information in the system.

A client application 206 executes on the client computer 200 to access a server application 208 executing on the server 204. For example, the server application 208 may include a database application that receives a query from the client application 206 and accesses a customer database (not shown) for all customer data satisfying the query. During operation, the server application 208 may require configuration data recorded in a datastore (such as datastores 214 or 216). For example, a transaction server application can determine the security level of a user according to a "role" assigned to the user by an administrator or other means. Accordingly, the transaction server application might query a role definitions database to validate the user's access to a transaction database (not shown). In another example, the server application 208 accesses configuration information to verify that required services are available for its execution.

To obtain configuration information in the illustrated embodiment, the server application 208 accesses a runtime catalog 210 running on the server 204. The runtime catalog 210 causes one or more table object dispensers to create catalog table objects (shown generally as table system 218) providing the required configuration data in a table to the server application 208. A "table object" includes an object that provides a caller with access to underlying data, presenting that data in virtual "table" format through a defined table interface. A table object may also provide its own functionality, read and write caching and the triggering of external events, in addition to other features. The table data is accessed by a caller (e.g., a catalog server, a runtime catalog, or an overlaying logic table object) by way of a table-oriented interface, preferably including table cursor methods. In the exemplary embodiment, the runtime catalog 210 accesses configuration data in the datastores 214 and 216 through layers of abstraction provided by the table system 218 (i.e., including logic table objects (LT), such as logic table object 220, and data table objects (DTs), such as data table object 222).

A globally unique database ID (identifier) called a "DID" identifies each catalog database. A given DID guarantees a minimum well-defined set of catalog tables, each table being identified by and complying to the rules of a table ID (TID). A DID is a datastore-independent identity, meaning that the tables of that database can be distributed among multiple datastores. Examples of datastores include the registry, type libraries, SQL (structured query language) Servers, and the NT Directory Service (NT DS), whereas examples of databases include: server group databases, download databases, and deployment databases.

A data table object, such as data table object 222, is a datastore-dependent table object that exposes a table cursor into a particular datastore. The table cursor provides a well-defined table-oriented interface into the datastore while hiding the location and format of the underlying datastore itself. For example, a caller can use a table cursor to navigate through the rows of a column in a table presented to the caller by a table object.

Each data table object is bound to a particular datastore accessible within the computer. For example, a data table object may be bound to the registry to provide the registry data in table form to a higher level (e.g., an overlaid logic table object, catalog server object, or runtime catalog). Another data table object may be bound to the NT Directory Services to provide directory configuration data to a higher level. As shown by data table objects 238 and 240, multiple data table objects may be created for a single datastore (e.g., data table objects 238 and 240 are created by different logic tables objects to provide access to the same datastore 242).

The data table object 222 populates one or more internal caches with read or write data associated with the datastore 214. Queries to the datastore 214 are serviced by the cache or caches through the data table object's table interface. Using at least one "update" method, data in the read cache of data table object 222 may be refreshed from the datastore 214 and data in a write cache may be flushed to the datastore 214. Data table objects are described in more detail in U.S. patent application Ser. No. 09/360,442, filed Jul. 26, 1999, entitled "DATA TABLE OBJECT INTERFACE FOR DATASTORE," assigned to the assignee of the present application, filed concurrently herewith and incorporated herein by reference for all that it discloses and teaches.

A logic table object, such as logic table object 220, presents domain-specific table data by logically merging or consolidating table data from multiple data table and/or logic table objects, supplementing table functionality, and/or synthesizing data into the table. Logic table objects in a COM+ Catalog environment are type-independent abstraction layers between a caller (such as the runtime catalog 210) and one or more datastores (such as datastores 214 and 216) containing configuration information. A logic table object typically sits atop one or more data table objects and introduces domain-specific rules and processes to the underlying data table objects, although other configurations of table systems are possible.

More specifically, a logic table object can logically merge or consolidate configuration data from multiple data table and/or logic table objects into a single table based on predetermined logic (e.g., according to type). Furthermore, a logic table object can supplement data table object functionality by intercepting interface calls from a client and adding to or overriding the underlying table object functionality (e.g., adding validation or security). Additionally, a logic table object can synthesize data that is not available from the underlying datastores or tables and present the synthesized data as part of the table. Logic table objects are described in more detail in U.S. patent application Ser. No. 09/360,440, filed Jul. 26, 1999, entitled "A LOGIC TABLE ABSTRACTION LAYER FOR ACCESSING CONFIGURATION INFORMATION," assigned to the assignee of the present application, filed concurrently herewith and incorporated herein by reference for all that it discloses and teaches.

The foregoing discussion has described the COM+ Catalog environment as used at runtime by an application. An alternate use of a COM+ Catalog occurs at configuration-time and may employ one or more catalog server objects (CS) and one or more client tables. During configuration, an administration tool, such as Microsoft's Component Services administration tool or COMAdmin Library, is used to create and configure COM+ applications, install and export existing COM+ applications, manage installed COM+ applications, and manage and configure services locally or remotely. Accordingly, in addition to the illustrated embodiments, an embodiment of the present invention may be employed by a local administration tool managing an application running on a remote computer system.

The exemplary administration tool 224 executes on the client computer 200 in FIG. 2. An alternative administration tool (such as administration tool 250) can execute on another computer (such as server 204) to configure applications and services executing in the computer. A catalog server object, such as catalog server objects 226, 228, and 230, manages configuration information on its computer. All administration requests to a computer, whether local or from another computer, go to a catalog server object on that computer, preferably through one or more abstraction layers, including client table objects and logic table objects.

A client table object (CT) is analogous to a data table object that binds to a particular local or remote catalog server object instead of a datastore, presenting the configuration information marshaled by a catalog server object in table form to the caller, such as the administration tool 224. The local catalog server object 226 manages configuration data locally on the client computer 200, while the remote catalog server object 228 service catalog requests from the client table object 232 for configuration information on its remote computer. "Remote" does not necessarily imply that a remote computer geographically distant from a local computer. Instead, remote merely indicates a cross-computer boundary, which may be bridged by a data bus, a network connection, or other connection means.

To access available catalog data in the illustrated exemplary embodiment, the administration tool 224 optionally causes a logic table object 234 to be created, which in turn causes client table objects 232 and 236 to be created for accessing available catalog server objects 226, and 228. The local catalog server object 226 and the remote catalog server object 228 marshal the configuration information stored within their corresponding computers by causing creation of underlying table systems and transferring the data back to the client table objects 232 and 236 for presentation as table data to the logic table object 234, which logically merges the configuration information and presents the configuration information to the administration tool 224 in table format. In the illustrated embodiment, multiple domain-specific logic table objects (such as logic table object 234) can reside between the client table objects 232 and 236, and the administration tool 224. Alternatively, the administration tool 224 may cause only a single client table object (with or without overlaying logic table objects) to be created to access a single catalog server object on a local or remote computer.

Figure 3:
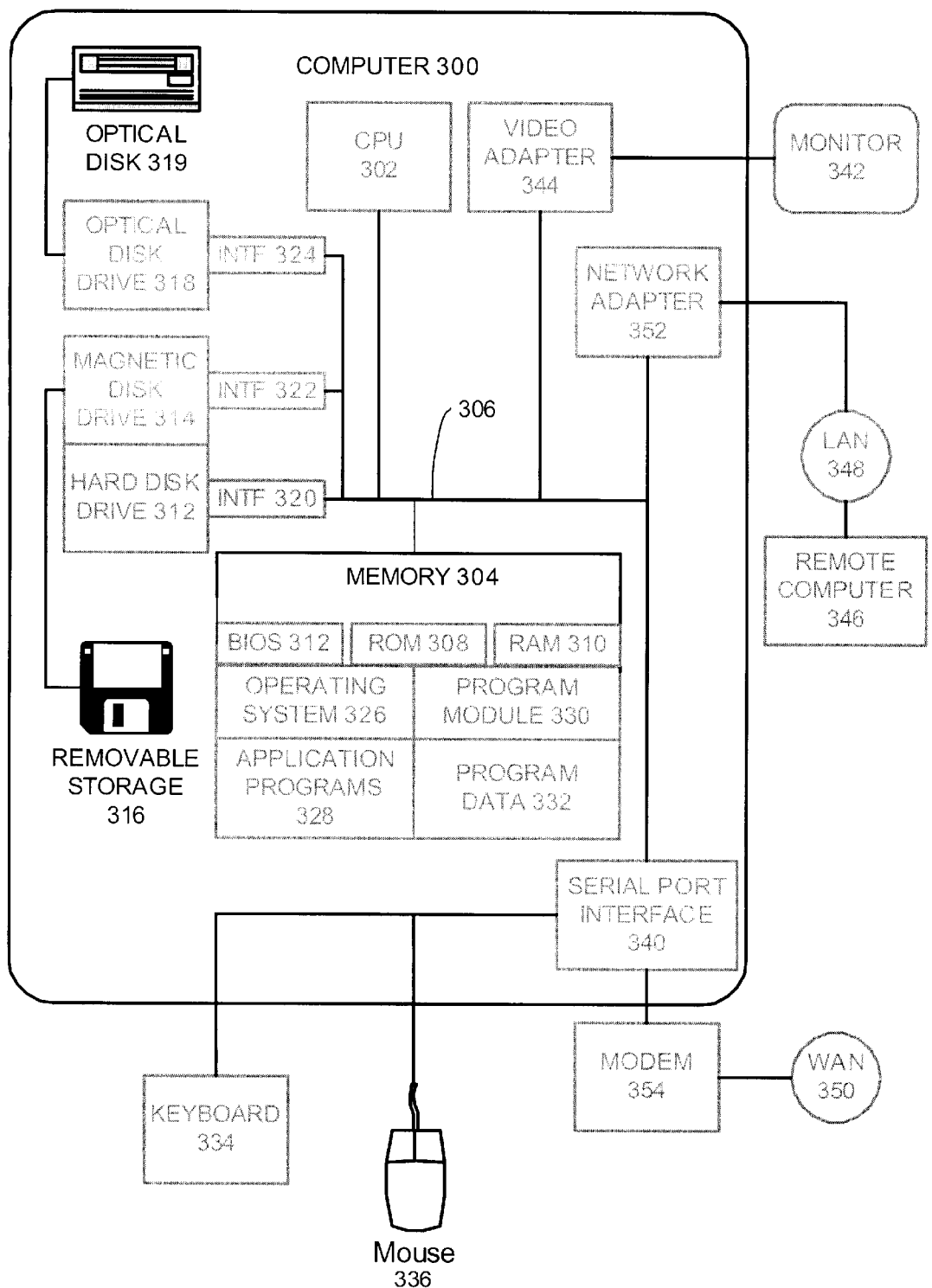
FIG. 3 illustrates an exemplary computing system for implementing the present invention comprising a general purpose computing device in the form of a conventional computer.

With reference to FIG. 3, an exemplary computing system for embodiments of the invention includes a general purpose computing device in the form of a conventional computer system 300, including a processor unit 302, a system memory 304, and a system bus 306 that couples various system components including the system memory 304 to the processor unit 300. The system bus 306 may be any of several types of bus structures including a memory bus or memory controller, a peripheral bus and a local bus using any of a variety of bus architectures. The system memory includes read only memory (ROM) 308 and random access memory (RAM) 310. A basic input/output system 312 (BIOS), which contains basic routines that help transfer information between elements within the computer system 300, is stored in ROM 308.

The computer system 300 further includes a hard disk drive 312 for reading from and writing to a hard disk, a magnetic disk drive 314 for reading from or writing to a removable magnetic disk 316, and an optical disk drive 318 for reading from or writing to a removable optical disk 319 such as a CD ROM, DVD, or other optical media. The hard disk drive 312, magnetic disk drive 314, and optical disk drive 318 are connected to the system bus 306 by a hard disk drive interface 320, a magnetic disk drive interface 322, and an optical drive interface 324, respectively. The drives and their associated computer-readable media provide nonvolatile storage of computer readable instructions, data structures, programs, and other data for the computer system 300.

Although the exemplary environment described herein employs a hard disk, a removable magnetic disk 316, and a removable optical disk 319, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 316, optical disk 319, ROM 308 or RAM 310, including an operating system 326, one or more application programs 328, other program modules 330, and program data 332. A user may enter commands and information into the computer system 300 through input devices such as a keyboard 334 and mouse 336 or other pointing device. Examples of other input devices may include a microphone, joystick, game pad, satellite dish, and scanner. These and other input devices are often connected to the processing unit 302 through a serial port interface 340 that is coupled to the system bus 306. Nevertheless, these input devices also may be connected by other interfaces, such as a parallel port, game port, or a universal serial bus (USB). A monitor 342 or other type of display device is also connected to the system bus 306 via an interface, such as a video adapter 344. In addition to the monitor 342, computer systems typically include other peripheral output devices (not shown), such as speakers and printers.

The computer system 300 may operate in a networked environment using logical connections to one or more remote computers, such as a remote computer 346. The remote computer 346 may be a computer system, a server, a router, a network PC, a peer device or other common network node, and typically includes many or all of the elements described above relative to the computer system 300. The network connections include a local area network (LAN) 348 and a wide area network (WAN) 350. Such networking environments are commonplace in offices, enterprise-wide computer networks, intranets, and the Internet.

When used in a LAN networking environment, the computer system 300 is connected to the local network 348 through a network interface or adapter 352. When used in a WAN networking environment, the computer system 300 typically includes a modem 354 or other means for establishing communications over the wide area network 350, such as the Internet. The modem 354, which may be internal or external, is connected to the system bus 306 via the serial port interface 340. In a networked environment, program modules depicted relative to the computer system 300, or portions thereof, may be stored in the remote memory storage device. It will be appreciated that the network connections shown are exemplary, and other means of establishing a communication link between the computers may be used.

In an embodiment of the present invention, the computer system 300 stores the configuration data and implementation code providing the catalog infrastructure and disclosed and claimed herein in accordance with the present invention. The catalog infrastructure has without limitation one or more datastores, catalog servers, runtime catalogs, server applications, administration tools, dispensers, and wiring databases. Specifically, one or more dispensers, preferably including a table dispenser and a table object dispenser, provide a table object to a caller providing location and type independent access to configuration information stored in one or more datastores.

Figure 4:
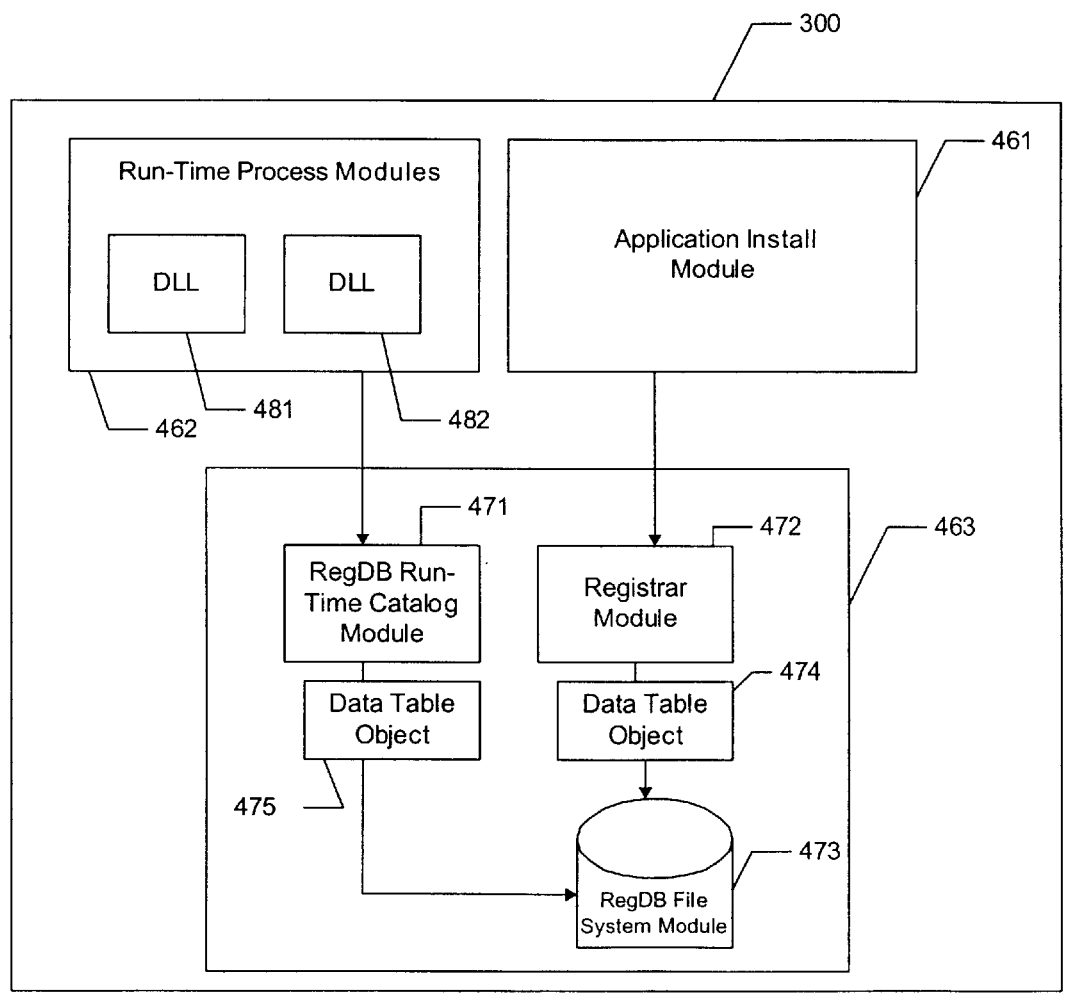
FIG. 4 illustrates operational modules used comprising an object registration system according to an example embodiment of the present invention.

FIG. 4 illustrates operational modules used in an object registration system according to one preferred embodiment of the present invention. The computing system 300 comprises one or more runtime modules 462, one or more application install modules 461, and a Catalog module 463. Runtime modules 462 comprise one or more Dynamic Link Libraries (DLL) 481–482 and other executable processes that execute a set of computing instructions on the computing system 300 to perform any number of processing tasks. Typically, these Runtime process modules 462 are the programs controlled by a user of the computing system 300 to perform a set of desired operations. In a preferred embodiment, the registration system installs and registers COM component objects within a registration datastore. The present invention may also be used to install and register other software object within a registration datastore without deviating from the spirit and scope of the present invention as expressed within the claims attached hereto.

Component administration modules 461 have the set of software processes that administer one or more software components onto computing system 300. One such administrative function installing application programs that are developed by various software developers. However, these modules 461 may have any computational process, executing upon computing system 300, that creates and installs components within the registration module for use by other runtime modules 462 in the performance of their respective functions.

The Catalog module 463 maintains the system component registration database, RegDB datastore, for use by the runtime modules 462 and the application install modules 461. The runtime modules 462 interact with a RegDB runtime catalog module 471 to obtain runtime catalog information from the RegDB datastore 473 when the runtime modules 462 are interacting with other components within computing system 300. The component administration modules 461 interact with the Registrar 472 when components, and their corresponding registration data are being installed within computing system 300. The operational flow of the registrar module 463 is discussed in more detail with reference to FIG. 6 below.

Figure 5:
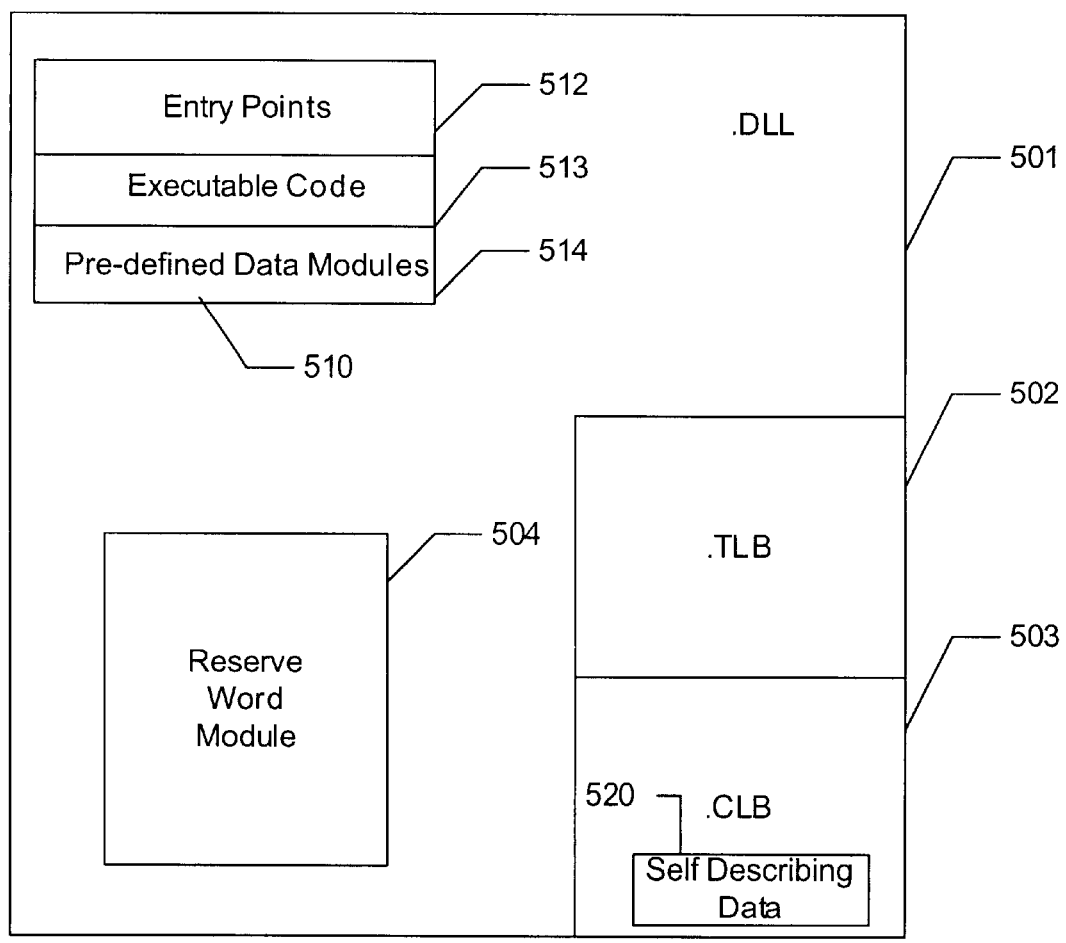
FIG. 5 illustrates a self-describing COM object according to one example embodiment of the present invention.

FIG. 5 illustrates a self-describing COM object according to one example embodiment of the present invention. The self-describing COM object comprises a DLL file 501 generated by a software developer using various development tools. Typically, source code written in a high-level programming language such as C++ is passed through a compiler and linked together to form the DLL file. The DLL comprises a set of type libraries (.TLB data) 502, a set of COMLib data (CLB data) 503, and other developer specific items 510. These other developer specific items 510 may have entry points defined within the DLL, when the object is to be used in some manner 512, other executable code modules used when the DLL is utilized 513, and pre-defined data modules used by the DLL during its operation 514.

The TLB data comprises the type library data used in the conventional manner within a WINDOWS operating system environment. The type library data is used to define class and interfaces for the DLL objects. This data will be added to the system registry in a conventional manner.

The CLB data comprises the COM library attributes used to control the operation of the COM components. COM+ 1.0 defines a set of attributes that are associated with a compiled component. These attributes are intrinsically tied to a specific implementation of a component; they are essentially "cast in stone" when the component is compiled and the component is designed. COM+ self-describing components are required to carry a type library that describes the interfaces they implement.

For existing COM Components, the COM Explorer allows developers and application integrators to specify these attributes as external configuration information. COM+ stores this information in the COM+ registration database. Although these attributes are intrinsic attributes of a component, they can be edited but are conceptually immutable.

COM+ Components can provide some or all of these attributes as part of the component itself.

Attributes can be declared at different levels:

Interface Definition: an abstract COM interface that is defined with global scope. All classes that claim to implement this interface need to adhere to the interface contract. Attributes declared on an interface definition are part of the interface contract and must thus be satisfied by all classes that implement the interface.

Method Definition: a method in an interface definition. Again all classes that implement a method in an interface definition must conform to all attributes that are declared on the method in the interface definition.

Class Implementation: a specific implementation or one or more interface definitions. Attributes on this class either express intrinsic characteristics of a class or are to be applied to all interfaces and methods implemented by this class.

Interface Implementation: a specific implementation of an interface definition as implemented by a specific class. Attributes on an interface implementation apply to a specific implementation of an interface definition in a specific class. Other implementations by different classes of the same interface definition can have different attributes. Interface implementation attributes typically do not change the client visible interface contract.

Method Implementation: a specific implementation of a method definition in an interface definition.

The syntax for COM+ 1.0 C++ attributes uses the following conventions that were established for all C++ attributes in Visual C++ 6.1:

attributes may have the form keyword only or keyword (value)

a value may be a string (in quotes), a number, or a comma-separated list of values enclosed in curly braces.

A "COM+ Module" in corresponds to a binary (DLL or EXE), that contains the implementation of one or more COM classes. A "COM Component" is defined as a COM+ module plus any additional files and resources that are required to run classes in the component.

The ModuleID is an authored GUID that identifies a specific kind of module. It is similar to the binary name, but established a globally unique identifier to this module. The ModuleID is used during registration to detect updates of existing modules: in COM+ 1.0 the registration system validates if a module with the same ModuleID is already registers and refuses installation of the new module until the old module is unregistered. Override flags allow the old module to remain registered with COM semantics: classes implemented by the previous module, but not implemented by the new module are still visible. Tools should allow developers to explicitly specify the ModuleID or guarantee that the Module ID does not change once it is established, unless the developer performs the equivalent of a module rename operation. An example of how this attribute is set is shown below.

```
uuid-attribute:
        uuid = string-uuid              OPTIONAL
```

The locale attribute (LCID) indicates for which this module is authored. If the module has no localizable content (error strings etc.), the LCID should be 0. Tools should allow developers to explicitly specify the locale. If the developer does not specify a locale, the LCID should be 0. Some tools may be able to determine the locale of a module based on other factors, in which case the default LCID can be set to this locale without providing an explicit option to the developer. An example of how this attribute is set is shown below.

```
locale-attribute:
        lcid = integer-constant         OPTIONAL
    CustomRegistration attribute is a flag that indicates if the
module requires additional registration beyond data-driven COM+
registration. If this flag is specified, the COM+ registration system will
look for a DllRegisterServer entry point and invoke it if present. An
example of how this attribute is set is shown below. custom-registration-
attribute:
        custom_reg [= TRUE]     OPTIONAL, default = FALSE
```

The CustomRegistrar attribute is a GUID that indicates a registrar component, which the COM+ registration system will invoke in order to initiate the registration of the component. This mechanism is primarily used for components that carry COM+ meta-data but don't provide actual binary code themselves (COMTI tlbs). An example of how this attribute is set is shown below.

```
registrar-attribute:
        registrar = string-uuid         OPTIONAL
```

Most fundamental class attributes are specified in the type library, which is required for any COM+ 1.0 self-describing component. These attributes include the set of interfaces implemented by a class, the CLSID and the human-readable class name. Additional attributes are described in the component library. Methods are not part of the class attributes, but described as interface attributes in the type library. Again, additional interface attributes are described in the component library. Currently COM+ does not define any attributes associated with a specific interface implementation or a specific method implementation on a class.

CLSID attribute indicates the CLSID of the class. An example of how this attribute is set is shown below.

```
uuid-attribute:
        uuid ( string-uuid )    OPTIONAL, DEFAULT = compiler
                                generated, best effort to maintain constant
                                at recompilation
```

Name attributes is a human-readable name for the class. Only used for UI purposes. An example of how this attribute is set is shown below.

```
name-attribute:
        class_name ( string )   OPTIONAL, DEFAULT = C++ class
                                name
```

Version attribute indicates a version number of the class in <major>.<minor>.<build><subbuild>format. The version number is stored as a 64 bit integer. Each element of the version number is represented as a 16 bit signed integer. The module version must be identical to the file version number, if a file version number is specified. The module version is authored. Tools should allow developers to explicitly specify a module version. If the developer does not specify a module version, tools should do a "best effort" to maintain increasing version numbers across compilations (or releases of a product), especially across multiple developer machines. An example of how this attribute is set is shown below.

```
version-attribute:
        class_version ( string-uuid )   OPTIONAL, DEFAULT =
                                        compiler generated, "1.0.0.0",
                                        best effort to maintain
                                        increasing version number
                                        sequence across compilations.
```

Default ProgID attribute indicates the DefaultProgID for the class. An example of how this attribute is set is shown below.

```
progid-attribute:
        progid ( progid-string )    OPTIONAL, DEFAULT = class name
progid-string:
        string-literal
```

VIProgID attribute indicates the version independent ProgID for the class. An example of how this attribute is set is shown below.

```
version-independent-progid-attribute:
        vi_progid ( progid-string )     OPTIONAL, DEFAULT: none
```

AlternateProgIDs attribute indicates one or more other ProgIDs to be associated with this class. An example of how this attribute is set is shown below.

```
alternate-progids-attribute:
        alternate_progid = { + progid-string }    OPTIONAL,
                                                  DEFAULT:
                                                  noneFile
```

Extensions attribute indicates one or more file extensions to be associated with this class. An example of how this attribute is set is shown below.

```
fileextension-attribute:
        file_ext ( string-literal + [, string-literal] )    OPTIONAL,
                                                            MULTI
```

MIME Type(s) attributes indicates one or more MIME types to be associated with this class. An example of how this attribute is set is shown below.

```
mime-type-attribute:
        mime ( string-literal + [, string-literal] )    OPTIONAL,
                                                        MULTI
```

Formats attributes has three different attributes: Supported, Converted From/To, Default. OLE formats supported by this class. Refer to the Platform SDK for more information. An example of how this attribute is set is shown below.

```
default-file-format-attribute:
        default_format ( string-literal )    OPTIONAL
supported-format-attribute:
        supported_formats                    OPTIONAL, MULTI
        ( string-literal + [, string-literal] )
converts-from-format-attribute:
        converts_from                        OPTIONAL, MULTI
        ( string-literal + [, string-literal] )
converts-to-format-attribute:
        converts_to                          OPTIONAL, MULTI
        ( string-literal + [, string-literal] )
```

DefaultIcon / IconResourceID attribute is a default icon to be used to represent this class for user interface purposes. An example of how this attribute is set is shown below.

```
icon-attribute:
        icon ( [ id = ] icon-resource-id , [ file= ]icon-    OPTIONAL
        file )
icon-resource-id:
        integer-constant
icon-file:
        string-literal
```

ToolBoxBitmap / BitmapResourceID attribute is a bitmap to be used in tools to represent this class. Refer to the Platform SDK for more information. An example of how this attribute is set is shown below.

```
thumbnail-icon-attribute:
        thumbnail_icon ( [id = ] icon-resource-id ,    OPTIONAL
        [ file = ] icon-file )
```

Short User Name attribute is a name to be used in OLE user interface dialogs. An example of how this attribute is set is shown below.

```
short-display-name-attribute:
        short_user_name ( string-    OPTIONAL
        literal )
```

Threading Model attribute indicates a threading model of the class. Possible values correspond to the previously defined threading model values "Apartment", "Both", "Free" and "Main". New in COM+ 1.0 is the "Neutral" threading model, which indicates that instances of the class can be used from any thread, but only one thread at a time can ever be active for a given instance. In other words: the class may not rely on thread local storage to keep state between method invocations and does not need to synchronize access to per-instance state. For more details refer to the COM+ Apartments specification. If at registration time the value "not specified" is found, the COM+ registration system will default to "Both". An example of how this attribute is set is shown below.

```
threading-model-attribute:
        threading ( threading-model-value-strings )    OPTIONAL,
                                                       DEFAULT =
                                                       not_specified
threading-model-value-strings:
        neutral
        free
        both
        apartment
        single
```

FixedInterfaceSet attribute is a Boolean flag indicating if the type library of the component describes the full interface set of the component. Future versions of COM+ will use this information to optimize network roundtrips on creation and on calls to IUnknown::QueryInterface.

Component Categories attribute is two lists of GUID indicating the component categories implemented or required by this class. An example of how this attribute is set is shown below.

```
implements-cocat-attribute:
        cocat_impl                                  OPTIONAL,
        ( category-value + [, category-value])      MULTI-OCCUR
category-value:
        category-identifier
requires-cocat-attribute:
        cocat_required                              OPTIONAL,
        ( category-value + [, category-value])      MULTI-OCCUR
category-identifier:
        guid-string
        guid-struct
```

Transaction is an attribute indicating the class's requirements on the transaction service. If the value is "not specified" the registration system will assume that the component will ignore transactions in the context but will not interact with any transaction protected resource (value "Transaction Ignored"). An example of how this attribute is set is shown below.

```
transaction-attribute:
        transaction ( tx-attr-values + [, vote-value])    OPTIONAL,
                                                          DEFAULT =
                                                          not_specified
tx-attr-values:
        not_supported
        supported
        required
        requires_new
```

Votes in Transaction Attribute is a boolean flag indicating if the class gets to decide whether or not to commit a transaction. This is used for optimization at runtime. An example of how this attribute is set is shown below.

```
vote-value:
        no_vote       OPTIONAL, DEFAULT = votes in transaction,
                      can not be specified if Tx = not_supported
                      or no Tx attribute is specified
```

Synchronization attribute indicates if the class supports or requires synchronization. An example of how this attribute is set is shown below.

```
synchronization-attribute:
        synchronization ( sync-attr-values )    OPTIONAL,
                                                DEFAULT =
                                                not_specified
sync-attr-values:
        not_supported
        supported
        required
        requires_new
```

Load Balancing Attribute is a flag indicating if the class can be used as part of a load-balancing cluster. This flag implies that the class does not rely on any machine specific state between creations, and that it does not share any state with other classes in the same module, process or machine, which is not accessible to other instances of these classes. Also, load balancing requires that Response Stats be enabled. Poolable attribute is a flag indicating if the class can be safely used with the COM+ object pooling feature. An example of how this attribute is set is shown below.

```
load-balancing-attribute:
        load_balancing ( lb-attr-values )    OPTIONAL, DEFAULT =
                                             not_specified
lb-attr-values:
        not_supported
        supported
```

Poolable attribute is a flag indicating if the class can be safely used with the COM+ object pooling feature. An example of how this attribute is set is shown below.

```
pooling-attribute:
        object_pooling ( op-attr-values )    OPTIONAL, DEFAULT =
                                             not_specified
op-attr-values:
        not_supported
        supported
```

JITActivation attribute is a flag indicating if the class can be safely used with the COM+ object just-in-time activation feature. An example of how this attribute is set is shown below.

```
JIT-attribute:
        jit_activation ( jit-attr-values )    OPTIONAL, DEFAULT =
                                              not_specified
jit-attr-values:
        not_supported
        supported
```

Role Access Check attribute is utilized to indicate that a class, interface or method is to be configured to allow access to members of a specified role. A particular class, interface or method can specify multiple roles. The specified set of roles is a hint to the application developer and can be overridden at application development time. An example of how this attribute is set is shown below.

```
allow-access-attribute:
        allow_access ( + role-name )    OPTIONAL,
                                        MULTI-OCCUR,
                                        DEFAULT = don't add role
access
role-name:
        string-literal
```

Role Access Checks can also be specified as a interface implementation attribute using the following syntax:

```
allow-interface-access-attribute:
        allow_interface_access ( interface-id ,    OPTIONAL,
          + role-name )                            MULTI-
                                                   OCCUR
```

Role Access Checks can also be specified as a method implementation attribute using the above "allow_access" syntax.

Role Reference attribute is utilized to Indicates that the implementation of a class performs programmatic checks for a specific role and applies different semantic behavior depending on the role membership of the caller. At the time a component is installed into an application, the referenced roles will be added to the target application. The application developer should not be able to remove these roles, but can choose to not assign any users to the roles. Role References can only be applied to classes, not individual interfaces or methods. An example of how this attribute is set is shown below.

```
role-reference-attribute:
        role_reference ( * role-name )    OPTIONAL,
                                          MULTI_OCCUR,
                                          DEFAULT =
                                          don't add role reference
```

Most fundamental interface definition attributes are described in the type library. Additional attributes are captured in the component library. IID attribute is an Interface ID of the interface. An example of how this attribute is set is shown below.

```
uuid-attribute:
        uuid ( string-uuid )              REQUIRED
```

Queueable attribute is a flag indicating if this interface can be invoked over deferred transports (Queued Components). The interface may not have any out parameters, including status codes as the return value. An example of how this attribute is set is shown below.

```
queuable-attribute:
        queuable ( queue-attr-values )    OPTIONAL, DEFAULT =
                                          supported if no method in
                                          the interface has an out
                                          parameters. Can not specify
                                          supported if any method in the
                                          interface has an
                                          out parameter.
queue-attr-values:
        not_supported
        supported
```

ProxyStub CLSID is utilized to indicate that the interface is to be marshaled via a custom or MIDL generated proxy/stub as opposed to typelibrary-marshaled. The GUID indicated the proxy/stub class id to be registered for marshaling the interface. An example of how this attribute is set is shown below.

```
proxystub-attribute:
        proxy_stub ( string-uuid )        OPTIONAL
```

Auto Done Attribute is utilized to indicate that a class can be safely deactivated after a call to this method. An example of how this attribute is set is shown below.

```
auto-done-attribute:
        auto_done          OPTIONAL, can only be specified if JIT
                           Activation = supported.
```

Figure 6:
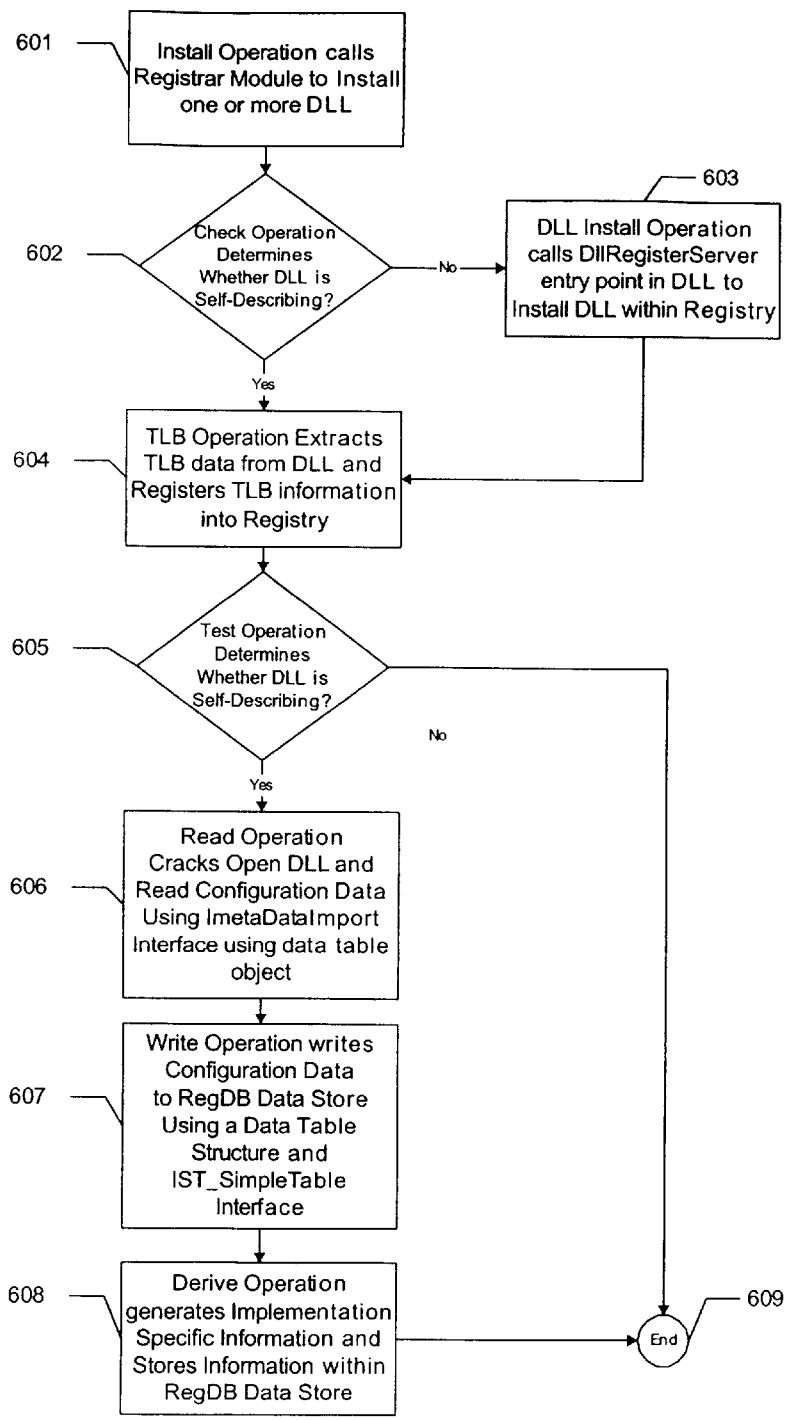
FIG. 6 illustrates a logical operation flow diagram for the operations performed during the object registration process according to one example embodiment of the present invention.

FIG. 6 illustrates a logical operation flow diagram for the operations performed during the object registration process according to one example embodiment of the present invention. The object registration process begins with the execution of an Install Operation 601. The Install Operation 601 calls the Registrar module 472 to perform the installation and registration of one or more DLL files. All further operations occur under the control of the Registrar module 472.

The Registrar module 472 begins by performing a Check Operation 602 to determine whether the DLL being installed comprises a self-describing component. The Check operation 602 understands the structure of the DLL and may read the contents of the file to determine if the CLB data is present within the DLL file. Typically, a pointer to the CLB data is stored within the DLL file in a particular location. This pointer may be located within a set of system reserve words. The CLB pointer may be located at a particular offset from the beginning of these reserve words within a Reserve Block module 504. No other item will be stored within this particular location within the Reserve Block module 504. If the pointer is found within this location, the Registrar module 472 may identify the DLL as self-describing. If the pointer is not present and the reserve word contains an invalid value, the Registrar module 472 may determine that the component is not self-describing.

If the Check operation 602 determines that the DLL component 501 is not self-describing, the registrar module 472 executes a DLL install operation 603. This operation installs the DLL 501 in the conventional manner by utilizing the well-defined DLL entry point, DllRegisterServer. As described above, the DLL 501 itself must contain executable code to modify the registry to perform the installation and registration process.

Once the DLL install operation 603 completes, the Registrar module 472 performs a TLB operation 604. If the Check operation 602 determines that the DLL component 501 is self-describing, the Registrar module 472 will immediately perform the TLB operation 604. The TLB operation 604 extracts any type library data present within the DLL component 501 and registers the data within the system registry in the conventional manner.

The Registrar module next performs a Test operation 605 to again determine if the DLL component 501 is a self-describing component. This test is the same operation performed above in the Check operation 602. The Test operation 605 may perform the operation as described above or may be passed an indication of the outcome from the Check operation 602. If the DLL component 501 is not self-describing, the Registrar module 472 branches to the end of the processing 609 and terminates operation. If the DLL component 501 is self-describing, the Registrar module 472 installs the DLL module and stores the registration data within the RegDB datastore 473.

The remaining installation and registration process has a sequence of three operations: a Read operation 606, a Write operation 607, and a Derive operation 608. In the Read operation 606, the Registrar module reads the self describing data from a data table object 474. The data table object presents the self-describing data 520 in a tabular form to the registrar. The registrar invokes the data table object 474 which cracks open the DLL component 501 and extracts the Self-describing data 520 from within the CLB data 503 and presents it in a tabular form. As described above, the data table object 474 locates and extracts the Self-describing data 520 data using a system interface IMetaDataImport.

Once the Self-describing data 520 has been extracted, the Write operation 607 stores the Self-describing data 520 in an appropriate format into the RegDB datastore 473 through a data table object 474. The use of the data table object 474 provides storage format and storage location independence for the registration data. The data table object 474 presents this configuration data to processing modules, like the Registrar module 474, in tabular form as a data level table. As such, the storage format and storage location for this data may be changed as long the data table object 474 understands the corresponding format and location. Additionally, each process module, like the Registrar module 474, may be presented with its own data table object 474 optimized to satisfy the particular requirements of the module.

For example, the data table object 474 used by the Registrar module 472 requires the data table object 474 support both read and write operations to the RegDB datastore 473. In contrast, the RegDB runtime catalog module 471 only requires that its data table object 475 support read-only operations. Thus, these table objects may present the same data level table of registration data to the corresponding modules, but they do so in different ways that may be optimized to increase the performance of the various modules.

The installation and registration process concludes with the performance of the Derive operation 608. In this operation, the Registrar module 472 derives any additional registration information needed to install and registrar the DLL module 501 from the Self-describing data 520. This additional information may be needed to interface the DLL module 501 with other system supplied modules to provide various supported functions.

For example, COM modules support services such as transactions and queues. These particular services are supported by system provided modules within a COM supported system. When the Self-describing data 520 indicates that the DLL module 501 contains attributes that use these services, the Derive operation 608 recognizes the need to interface this DLL module 501 being installed with the system modules that support these services. The Derive operation 608 will include the necessary information within the RegDB datastore 473 to provide any interceptors and custom activators needed to link the DLL module 501 with the system modules. Once the Derive operation 608 completes, the Registrar module 472 has completed installing and registering the self-described DLL module 501 and processing terminates 609.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for installing and registering a software objects within a registration datastore of a computing system, the method comprising:
    checking the software object to determine whether it contains a set of self-describing data;
    if the software contains the set of self-describing data, perform the following:
        extracting the self-describing data from the software object;
        registering the software object using the extracted self-describing data by storing registration data within the registration datastore; and
        deriving additional registration data using the extracted self-describing data and storing the additional registration data within the registration datastore.

2. The method according to claim 1, wherein the method further comprises:
    extracting type library data comprises object class and interface information and storing the type library data within a system registry.

3. The method according to claim 2, wherein the method further comprises:
    if the software object does not contains the set of self-describing data, installing and registering the software object by calling a well-defined DllRegisterServer entry point within the software object.

4. The method according to claim 3, wherein the storing registration data within the registration datastore comprises:
    retrieving the contents of the registration datastore into a data table;
    modifying the data table; and
    updating the registration datastore with the modified data table.

5. The method according to claim 4, wherein the checking the software object to determine whether it contains a set of self-describing data uses a reserve word module within the software object to locate the set of self-describing data.

6. The method according to claim 5, wherein the extracting the self-describing data from the software object uses a reserve word module within the software object to locate the set of self-describing data.

7. The method according to claim 6, wherein the software object comprises a COM component object.

8. A method for installing and registering a COM component objects within a registration datastore of a computing system, the method comprising:
    extracting type library data comprises object class and interface information and storing the type library data within a system registry; and
    checking the COM component object to determine whether it contains a set of self-describing data;
    if the COM component does not contains the set of self-describing data, installing and registering the COM component by calling a well-defined DllRegisterServer entry point within the COM component;
    if the COM component contains the set of self-describing data, perform the following:
        extracting the self-describing data from the COM component;
        registering the COM component using the extracted self-describing data by storing registration data within the registration datastore; and
    deriving additional registration data using the extracted self-describing data and storing the additional registration data within the registration datastore; wherein
        storing registration data within the registration datastore comprises:
            retrieving the contents of the registration datastore into a data table;
            modifying the data table; and
            updating the registration datastore with the modified data table;
        checking the COM component object to determine whether it contains a set of self-describing data uses a reserve word module within the COM component to locate the set of self-describing data; and
        the extracting the self-describing data from the COM component uses the reserve word module within the COM component to locate the set of self-describing data.

9. A computer-readable medium having computer-executable instructions for the method recited in claim 1.

10. A computer-readable medium having computer-executable instructions for the method recited in claim 8.

11. A computer data signal embodied in a carrier wave readable by a computing system and encoding a computer program of instructions for executing a computer process performing the method recited in claim 1.

12. A computer data signal embodied in a carrier wave readable by a computing system and encoding a computer program of instructions for executing a computer process performing the method recited in claim 8.

13. A computer-readable medium having stored thereon a data structure defining a self-describing a software object to be read by a system registrar module to install and register the self-describing software object within a registration datastore, comprising:
    a first data field containing data representing a dynamic link library;
    a second data field derived from the first data field comprising a reserve word module;

a third data field derived from the second data field comprising one or more self-describing component data elements; and a fourth data field functioning to indicate the end of each self-describing software object;

wherein each self-describing component data elements are extracted by the system registrar module to generate data stored within the registration datastore.

14. The computer readable medium according to claim 13, wherein each self-describing component data elements comprises:

a classID attribute containing a globally unique identified for identifying the class; and a classVersion attribute containing a 64 bit version number for the class.

15. The computer readable medium according to claim 14, wherein each self-describing component data elements further comprises:

a SyncronizationServices attribute for indicating the synchronization behavior for the software object;

a LoadBalancingServices attribute for indicating the load balancing behavior for the software object;

a PoolableServices attribute for indicating the pooling feature behavior for the software object; and a JIT_activation attribute for indicating the just in time activation behavior for the software object.

16. The computer readable medium according to claim 15, wherein each self-describing component data elements further comprises:

a RoleAccessCheck attribute for indicating members of a specific role permitted access to the software object; and a RoleReference attribute for performing programmatic checks for a specific role and applying different semantic behavior based upon the role membership of a caller to the software object.

17. The computer readable medium according to claim 16, wherein:

the software object comprises a COM component object; and each self-describing component data elements further comprises:

an InterfaceID attribute for indicating the identity of an interface to the COM component;

a QueueServices attribute for indicating an interface to the COM component may be invoked over deferred transports;

a ProxyStubClassID attribute for indicating whether an interface to the COM component may be marshalled utilizing a custom proxy stub; and an AutoDone attribute for whether a class within the COM component may be safely deactivated after completion of a call to the COM component.

18. A computer data signal embodied in a carrier wave readable by a computing system and encoding a data structure defining a self-describing software object to be read by a system registrar module to install and register the self-describing software object within a registration datastore, comprising:

a first data field containing data representing a dynamic link library;

a second data field derived from the first data field comprising a reserve word module;

a third data field derived from the second data field comprising one or more self-describing component data elements; and a fourth data field functioning to indicate the end of the self-describing software object; wherein the one or more self-describing component data elements are extracted by the system registrar module to generate data stored within the registration datastore; and the one or more self-describing component data elements comprises:

a classID attribute containing a globally unique identified for identifying the class;

a classVersion attribute containing a 64 bit version number for the class;

a SyncronizationServices attribute for indicating the synchronization behavior for the software object;

a LoadBalancingServices attribute for indicating the load balancing behavior for the software object;

a PoolableServices attribute for indicating the pooling feature behavior for the software object;

a JIT_activation attribute for indicating the just in time activation behavior for the software object;

a RoleAccessCheck attribute for indicating members of a specific role permitted access to the software object; and a RoleReference attribute for performing programmatic checks for a specific role and applying different semantic behavior based upon the role membership of a caller to the software object.

19. The computer data signal according to claim 18, wherein:

the software object comprises a COM component object; and the one or more self-describing component data elements further comprises:

an InterfaceID attribute for indicating the identity of an interface to the COM component;

a QueueServices attribute for indicating an interface to the COM component may be invoked over deferred transports;

a ProxyStubClassID attribute for indicating whether an interface to the COM component may be marshalled utilizing a custom proxy stub; and an AutoDone attribute for whether a class within the COM component may be safely deactivated after completion of a call to the COM component.

* * * * *